United States Patent

[11] 3,603,217

[72] Inventors Charles E. Wright;
John Gunyou, both of Toronto, Ontario, Canada
[21] Appl. No. 791,572
[22] Filed Jan. 16, 1969
[45] Patented Sept. 7, 1971
[73] Assignee E.S. & A. Robinson (Canada) Limited
Toronto, Ontario, Canada

[54] METHOD OF FORMING A BAG
5 Claims, 8 Drawing Figs.
[52] U.S. Cl. .................................................. 93/35 SB,
93/33 H, 93/39.1 P, 93/55.1 P, 93/59 MT, 93/94
PS, 156/69, 229/5.5, 229/55, 229/58
[51] Int. Cl. ........................................................ B31b 49/04,
B31b 29/02, B31b 41/60
[50] Field of Search ........................................... 93/20, 26,
33, 35 RB, 39.1 P, 55.1 P, 59 MT, 94 PX, 82;
156/69; 229/5.5

[56] References Cited
UNITED STATES PATENTS

| | | | |
|---|---|---|---|
| 2,896,387 | 7/1959 | Brock............................ | 93/59 |
| 3,000,157 | 9/1961 | Ollier .......................... | 93/55.1 |
| 3,354,601 | 11/1967 | Schneider..................... | 53/28 |
| 3,354,795 | 11/1967 | Kugler.......................... | 93/33 |
| 3,395,622 | 8/1968 | Kugler.......................... | 93/35 |
| 3,495,504 | 2/1970 | Sloan............................ | 93/55.1 |
| 3,518,803 | 7/1970 | Wunderlich.................. | 93/55.1 |

*Primary Examiner*—Wayne A. Morse, Jr.
*Attorney*—Stevens, Davis, Miller & Mosher

ABSTRACT: A method for making a thermoplastic bag having limp sidewalls and a semirigid base which will have freestanding properties both when full or empty from flat webs of different thermoplastic materials whereby the heavy gauge, semirigid base is formed in situ, a tube of the lighter wall material is brought into contact with the formed base, heat sealed to the base which is simultaneously severed from the heavy sheet and severed from the tube material to form the finished bag.

PATENTED SEP 7 1971  3,603,217

METHOD OF FORMING A BAG

This invention relates to bags of thermoplastic material or material having at least one side which is heat-sealable thermoplastic and to the method for forming said bags. In particular, the present invention provides a method for producing a normally limp thermoplastic bag with a column-shaping bottom wall more rigid in nature than the sidewall that imparts substantial freestanding properties to the normally limp bag as a whole whether it is in a loaded or unloaded condition.

It is presently known to provide bags that are substantially freestanding when such bags are in a loaded condition. For example, rectangular-bottomed bags of thermoplastic material are manufactured which, when loaded with sugar, flour or the like, benefit from a flat bottom of substantial area which retains a bag in upright position. The retention of their upright position when loaded is accomplished by the weight of the contents spreading the flexible material of the bottom into conformity with the upholding surface such as a shelf or the like. However, it is extremely difficult to load such bags with produce because, in an empty or unfilled condition, the sidewalls tend to cling together in collapsed form and the bags will easily fall over on the loading line. Devices must therefore be provided to retain the bags in proper relationship to the product-loading mechanism. This known type of bag is often difficult to unload also due to the act that, when the bag is inverted so that the contents may be released, the bottom of the bag as well as the sidewall structure adjacent thereto easily collapses to trap portions of the produce within the bag.

The addition of a column-shaping rigid bottom does not remove from the bag the inherent collapsing properties which are desireable for shipping bulk quantities of bags but the formed bag, in its freestanding position is easily loaded with produce whereby the inclusion of mechanism on a production loading line for holding the mouths of the bags open may be obviated. Accordingly, then, the bag could be manufactured prior to and in conjunction with loading to take advantage of this condition.

In order to impart the above-mentioned column shaping to the wall structure of a thermoplastic bag, the bottom wall material is of a more rigid nature than the sidewall material. As applied in the present application, the term "rigid" may be defined as (a) a bottom wall that is heavier in weight or thicker in gauge than the material of the associated sidewall structure; (b) the particular shape of the bottom wall, i.e. the use of rigidifying ribs or the like; and (c) a bottom wall of the same weight as the sidewall structure, but being of higher density in molecular structure. Accordingly, a bag having a bottom wall that is rigid in structure and which is column-shaping in respect to its associated sidewall provides an easily shelf storable item from which contents may be gradually and easily removed without precollapsing of the bag adjacent its bottom wall. Moreover, such a bottom wall causes the associated flexible sidewall to retain a cross-sectional tubular shape corresponding to the annular or peripheral configuration of the bottom. One such bag is described in U.S. Pat. No. 3,354,601 issued Nov. 28, 1967 to Schneider et al.

According to one aspect of the invention the method of manufacturing a thermoplastic bag having a bottom wall and a continuous sidewall with the material of said bottom wall being more rigid in nature than the material of said sidewall comprises the steps of drawing a first web of thermoplastic material from a supply thereof; forming said first web into tubular form and seam welding said tube; drawing a second preheated web of thermoplastic material, more rigid in nature than said first web, normal to said tube; deforming a selected portion of said second web to provide a bottom wall having a peripheral flange; bringing the flange of said bottom wall and the periphery of one end of said tube into engagement with one another; heat sealing said tube onto said flange; and severing said tube from said first web and said bottom from said second web to form said bag.

An apparatus for manufacturing thermoplastic bags having a bottom wall more rigid in nature than its associated sidewall according to the method of the present invention is more fully described in our U.S. Pat. No. 3,540,355 issued Nov. 17, 1970 and assigned to a common assignee.

The invention is illustrated by way of example in the accompanying drawings in which.

Figure 1:
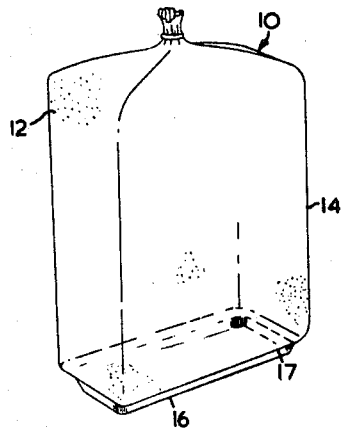
FIG. 1 is a perspective view of a bag made by the method of the present invention in a loaded state.
Figure 2:
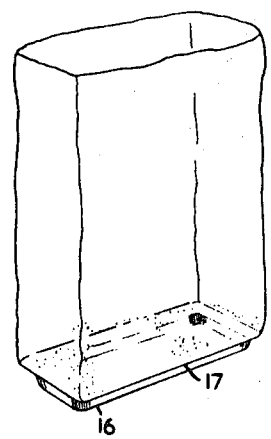
FIG. 2 is a view similar to FIG. 1 but showing the bag in an unloaded state in a freestanding position.

As shown in FIG. 1, a flexible-bodied bag 10 is formed from a heat-sealable material such as thermoplastic and is loaded with a substance 12 such as sugar. Bag 10 is provided with a tubular or columnar sidewall structure 14 also formed of thermoplastic material such as polyethylene or a material of which one surface is thermoplastic such as a plastic-coated paper or foil. Polyvinylidene chloride is often suitable as a coating. Connected to the lower end of the sidewall structure 14, for example by heat sealing, is a substantially flat bottom wall 16 of traylike configuration having an annular flange or bead 17 thereon. It will be appreciated that, in plan view, the bottom wall can be oval, square, rectangular or any polygonal shape although round or square is the preferred configuration for shipping and storing purposes. The material of the bottom wall 16 is more rigid in nature than the material of the sidewall 14 which imparts a column-shaping influence to the sidewall structure, the form of which is substantially retained even when the bag is in an unloaded or partially unloaded state as shown by FIG. 2.

During manufacture of the bag 10, the circumferential or peripheral distance of the sidewall 14 is at the most equal to that of the bottom 16 so that the cross section of the sidewall is maintained in close conformity to the traylike configuration of the bottom wall 16 in plan view thereof.

The material of the sidewall 14 may be the normal thin thermoplastic, for example, 0.002 to 0.007 inch in thickness and the material of the bottom wall may be substantially heavier in gauge, say in the region of 0.012 inch or thicker, or it may be of the same thickness as the sidewall structure but in such a case it would be of a denser molecular structure to adopt rigidity greater than that of the sidewall. As it has been previously mentioned, this manufacture could advantageously take place in combination with a bag-loading line whereby the bags, after forming, would drop down onto a delivery belt which would carry them to loading mechanisms.

One manner of forming the bag 10 shown in FIG. 1 would require only the heat sealing together of a preformed bottom wall 16 to a preformed tubular sidewall structure 14 as described in U.S. Pat. No. 3,354,601. But this entails expensive blank forming and cutting equipment, handling and storage of the preformed basis and special techniques to facilitate locating the base in juxtaposition to the tubular sidewall.

Figure 3:
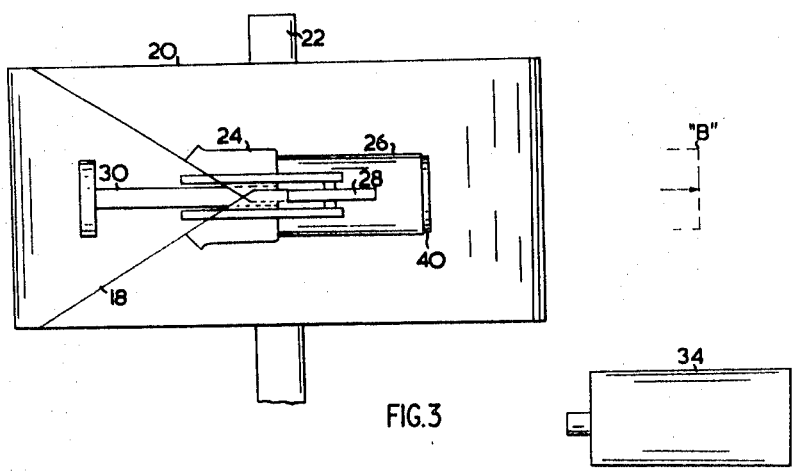
FIGS. 3 and 4 are schematic illustrations in elevation and plan view respectively of a portion of one embodiment of an apparatus suitable for preforming the sidewall structure of the bag before the bottom wall is applied thereto.
Figure 4:
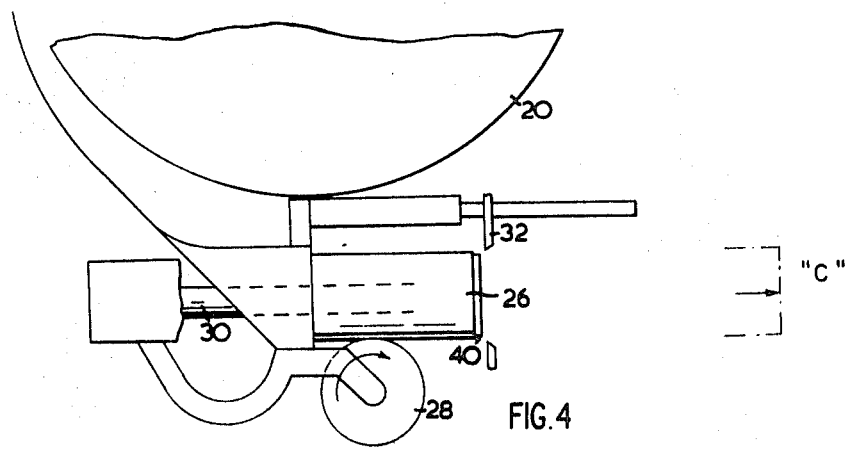

Referring to FIGS. 3 and 4, there is shown a supply of thermoplastic film 18, which may be preprinted and would on a roll 20 that is rotatable through a spindle 22. The apparatus comprises a forming horn 24; a forming mandrel 26; and a sealing mechanism such as a heater roller 28 or heater bar, not illustrated. In the method of the prior art, the film 18 is drawn off the roll 20, around the horn 24 to be overlapped as shown or mandrel 26 which is then advanced by means of an air cylinder 30 towards position B and as this advancement takes place, the film is continuously drawn off the supply roll 20 and the overlap is heat sealed by the mechanism 28. When the mandrel 26 reaches position B, performed bottom wall 16 from a magazine (not shown) is applied (FIG. 5) and the sidewall structure may be severed by a suitable cutoff mechanism 32, disposed at a position that is behind the mandrel when the latter is at position B. It will be appreciated, of course, that the cross-sectional configuration of the mandrel 26 adjacent its forward end constitutes the corresponding configuration of the formed sidewall of the bag 10. After the formed bag is severed from the supply roll by the mechanism 32 it may drop downwardly by gravity onto a delivery belt 34 or it may be assisted thereto by suitable mechanical means which is not illustrated.

The method of manufacture according to the present invention includes the forming and sealing together of the sidewall 14 and the bottom 16 from two separate webs of material. In accordance with the structure disclosed in FIGS. 5 to 7, a thermoplastic film 18 is drawn from the supply roll 20 around a forming mandrel 44, which cooperates with a male and female mold adjacent its terminal end for applying the bottom wall 16 to the sidewall of the bag. Furthermore, the male mold is provided with reciprocating means for working the mold towards and away from the end of the forming mandrel 44, which, in this case, is stationary. In this method therefore the formed bag is drawn along the forming mandrel by the male mold and severed from the next preformed bag by cutoff means.

Figure 5:
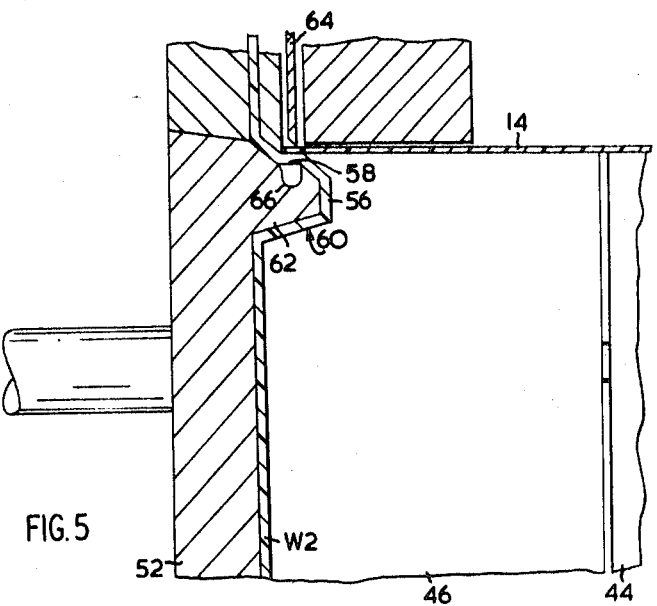
FIG. 5 is a schematic cross-sectional view of a portion of an apparatus for applying the rigid bottom wall to the sidewall structure of the bag.

Briefly, it is schematically shown in FIG. 5 that the terminal end of the forming mandrel is provided with a female mold. The associated male mold, by means of a reciprocating frame structure (FIG. 6), brings a traylike bottom wall, formed in situ, into engagement, about its periphery, with the peripheral terminal end edge of the sidewall structure of the bag performed on the mandrel. The male mold is provided with an annular recess so as to receive portions of the cutoff mechanism that pass through the two layers of film constituted by the sidewall and bottom wall structure of the bag. After a bottom wall has been heat sealed to the sidewall structure, the male mold is withdrawn corresponding to the length of the bag desired and the cutoff mechanism is again actuated and the bag is dropped from the apparatus.

Figure 6:
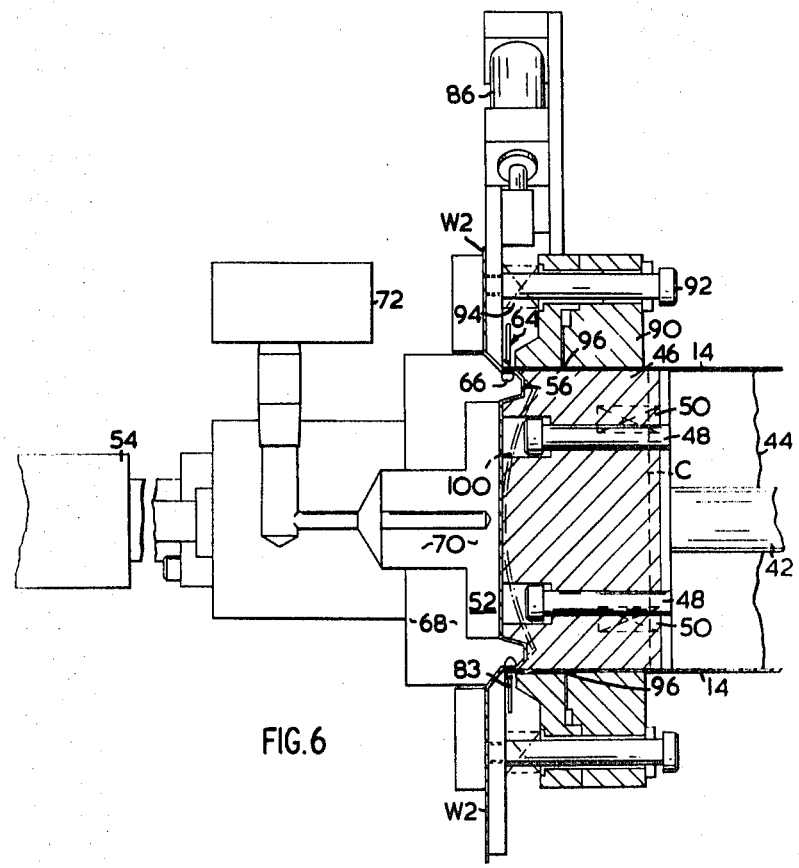
FIG. 6 is a more detailed illustration in elevation of the bottom forming and applying apparatus showing cutoff means for carrying out severing and sealing operations on a formed bag.
Figure 7:
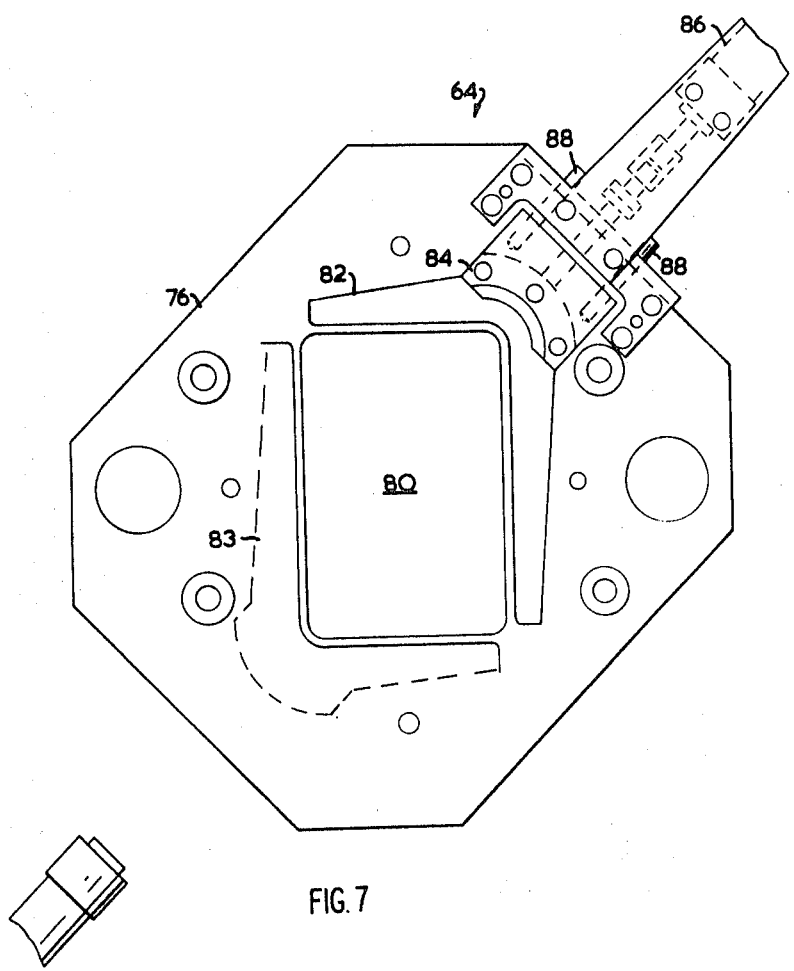
FIG. 7 is an illustration in elevation of the cutoff means shown in FIG. 6.

In FIG. 6, the forming horn 24 and film supply roll 20 together with the seam-welding mechanism 28 have been omitted for the sake of clarity. A mold carriage 42 supports a stationary forming mandrel 44 which is of circular configuration at its starting end, but it gradually assumes the configuration of the desired bottom wall as it approaches the female mold 46, the specific configuration being provided by the latter.

Female mold 46 is resiliently mounted in axial alignment on the end of the mandrel 44 by studs 48 and springs 50.

A male mold 52 is mounted on the mold carriage in juxtaposition and in seriatum with female mold 46. The male mold 52 deforms and presses a portion of a second, preheated, web of material, W2, into the female mold 46 to form the bottom wall 16. An air cylinder 54 is also provided on the mold carriage for axially reciprocating the male mold 52. FIG. 6 shows the molds in an operative position with the portion of the web W2 therebetween.

It will be seen that each mold is formed to provide a bottom wall 16 with an annular channel 56 adjacent its periphery and which is bounded on the extreme annular portion of the periphery by a bead or flat area 58 that is heat sealed to the sidewall 14 (see also FIGS. 1 and 2). This annular channel 56 is formed by an indented portion 60 in the female mold 46 and a corresponding protruding portion 62 in the male mold 52. Portion 62 is provided to allow annular insertion into the periphery of the male mold of cutoff mechanism 64 which must sever both the sidewall web 14 and the web W2 of the bottom wall material and the cutoff mechanism 64 is received in a peripheral recess 66 (see also FIG. 5).

Male mold 52 is made up of a die 66 die plug 70, the latter being connected to a venturi block 72 mounted on the mold carriage. Vacuum is applied through the venturi 72 to assist in forming the bottom wall 16 from the preheated web W2 and in cooperation with the male mold reciprocating means to effect the withdrawal of the formed bag from mandrel 44 through the reciprocating action of the air cylinder 54. When the withdrawal takes place, the cutoff mechanism 64 is again actuated to sever only the formed wall structure 14 from the remaining web on the mandrel which provides wall structure for the next bag in production.

The cutoff mechanism 64 is also mounted on the mold carriage by a mounting plate 76 (FIG. 7) adapted to be secured to shafts 48 of the carriage adjacent the forming mandrel 44. The plate 76 includes a central opening or aperture 80 conforming to the configuration of the bottom wall 16 of the bag. This opening 80 is bounded by blades of cutoff knives 82 and 83, which are heated to effect the necessary seal between the two webs of material. Each knife, for example 82, is secured to a follower 84 which, inturn is detachably connected to the piston rod of an associated air cylinder 86 that is suitably mounted to the plate 76. In accordance with actuation of the cylinders 86 the followers and their associated knives are adapted to reciprocate on guide pins 88 toward and away from the periphery of the bag structure and into and out of the recess 66 in the male mold 52. It will be seen from FIG. 6 that, at the time of severance and sealing of the two webs, the cutoff knives must be in radial alignment with the recess 66. Therefore, the cutoff mechanism is resiliently mounted, like the female mold 46, on a backup plate 90 which encircles the female mold as shown. The mounting is effected by studs 92 and springs 94 respectively. However, the direction of resilience is opposed with respect to the female mold 46.

The resilient mountings referred to allow axial shifting or "humping" of the female mold and in order to prevent backward buckling of the tubular wall 14 on the mold 46 and mandrel 44, vacuum is applied at 96 to hold the sidewall 14 in place while the female mold is axially moved by the male mold 52. As shown in FIG. 5, this allows frictional engagement between the end of sidewall 14 and the peripheral flange 17 of the bottom 16 while it is being formed and places these two webs in position for heat-sealing and severing.

Prior to describing a continuous method of manufacture, it will be appreciated that in an initial production run the first bag would be manually fed into the described apparatus. However, for a description of the automatic method it will be assumed that such an initail bag has already been formed.

A first web 18 of material, at least one surface of which is sealable thermoplastic, is drawn from a supply about a forming horn and on to the main forming mandrel 44 where it is directed around the surface of the mandrel, overlapped, and seam welded together by the sealing means described in connection with FIG. 3 to thereby form the wall structure 14 of the bag 10. The reciprocating mold 52 gradually draws the tube 14 along the mandrel 44 until one end is over the female mold 46 which, at this stage, is in its outward position indicated by the pecked line C. In this outward position, the shoulders of the studs 48 engage the corresponding shoulders on the mold 46 through the action of the springs 50. Furthermore, it will also be appreciated that the male mold 52 is withdrawn sufficiently to allow insertion past the face of the female mold of web W2 of the material for forming the bottom wall 16. This web is also drawn from a supply (not shown) and its temperature has been raised by known preheating means. The male mold 52 may be cooled so that, with the assistance of the vacuum, the web W2 will quickly conform to the configuration of the face of the mold 52 to form the rigid bottom 16.

Prior to the engagement of the molds, vacuum is applied to the sidewall structure 14 at 96. While the sidewall structure is so held, the male mold 52 is driven into engagement with the female mold 46 by the air cylinder with the web W2 therebetween. When this engagement takes place, female mold 46 is pressed axially backwardly against the springs 50 and a similar action applies to the studs and springs of the cutoff mechanism so that the elements are in the position shown in FIG. 5. This engagement allows the overlap of the web W2 and the sidewall structure 14 as shown.

The cutoff mechanism is then actuated and the knives (or heated wires) are brought radially inwardly into the confines of the recess 66 thereby severing the bottom 16 from web W2 and heat sealing together the flange 17 on the bottom 16 with sidewall 14 to complete the application of the bottom to the sidewall structure of the bag. The cutoff knives or wires are then withdrawn and the male mold 52 is subsequently withdrawn, vacuum being applied to the bottom 16, whereby the sidewall structure is drawn off of the forming mandrel 44. The cutoff mechanism is then again actuated in accordance with the length desired to form the complete bag 10 which drops from the apparatus.

It will be appreciated from the foregoing description of the apparatus and method for forming the bag in question, that the bottom wall 16 serves to retain the bag at its fullest periphery. Moreover, it is well within the scope of the present invention to apply the apparatus in combination with a loading and filling device for simultaneous operation. In such a combined operation, the center of the forming mandrel 44 would be hollowed out and used to direct produce into the center of the bag as it was formed. In such a case, the mandrel 44 could be oriented in a vertical position.

Figure 8:
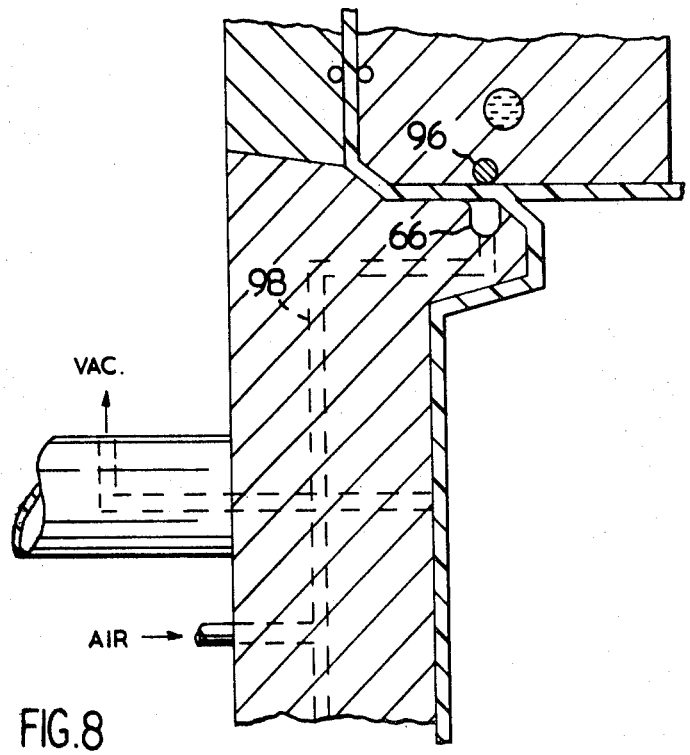
FIG. 8 is a schematic cross section of an alternative apparatus for sealing the bottom wall to the sidewall.

Furthermore, although the cutoff mechanism described herein is directed to knives that are heated to perform the sealing operation in combination with the cutting operation, it will be appreciated that heated wires and in particular impulse heated sealing wires or other sealing and severing media could be used. One such embodiment is shown in FIG. 8 wherein the knife 64 has been replaced with an impulse sealing wire 96. Additionally an air line 8 has been provided to channel 66 in order to assist sealing by insuring engagement of the side and bottom.

It has also been mentioned that variously shaped bottoms may be utilized in the present invention, the cross section of an alternate bottom 16 being shown in phantom line in FIG. 6 and bearing reference numeral 100. The dies or molds 46 and 52 would, of course, be suitably modified to provide such a bottom 100 and the molds, being quickly detachable from the apparatus, are adapted for rapid changeover.

I claim:

1. The method of manufacturing a thermoplastic bag having a bottom wall and a continuous sidewall with the material of said bottom wall being more rigid in nature than the material of said sidewall, said method comprising the steps of,
   a. drawing a first web of thermoplastic material from a supply thereof;
   b. forming said first web to form a tubular wall and seam welding said wall to form a tube;
   c. drawing a second web of preheated, thermoplastic material more rigid in nature than said first web, normal to said tube;
   d. mounting a female mold resiliently for limited axial movement on one side of said second web;
   e. deforming a selected portion of said second web into the female mold with a male mold mounted on the other side of said second web to from a bottom wall having a peripheral flange substantially parallel to said tubular wall;
   f. bringing the flange of said bottom wall and the tubular wall into engagement with one another;
   g. providing a heated cutting means which is shaped to the periphery of said molds and movable toward and away from said mold periphery;
   h. moving said heated cutting means in a plane substantially normal to and toward that portion of the tubular wall in engagement with the bottom wall peripheral flange so as to sever the bottom wall from the second web and heat seal said tubular wall and bottom wall.

2. The method of claim 1 in which said heat sealing and severing is simultaneously done.

3. The method of claim 1 including drawing said tube and sealed bottom off its forming site and severing said tube from said first web to form a bag.

4. The method of claim 1 wherein the heat sealing and severing is performed with a hot knife.

5. The method of claim 1 wherein the heat sealing and severing is performed by an impulse sealing wire.